April 10, 1962  E. W. GRABOWSKI ETAL  3,028,937
STRUCTURAL MEMBER
Filed March 24, 1959  2 Sheets-Sheet 1
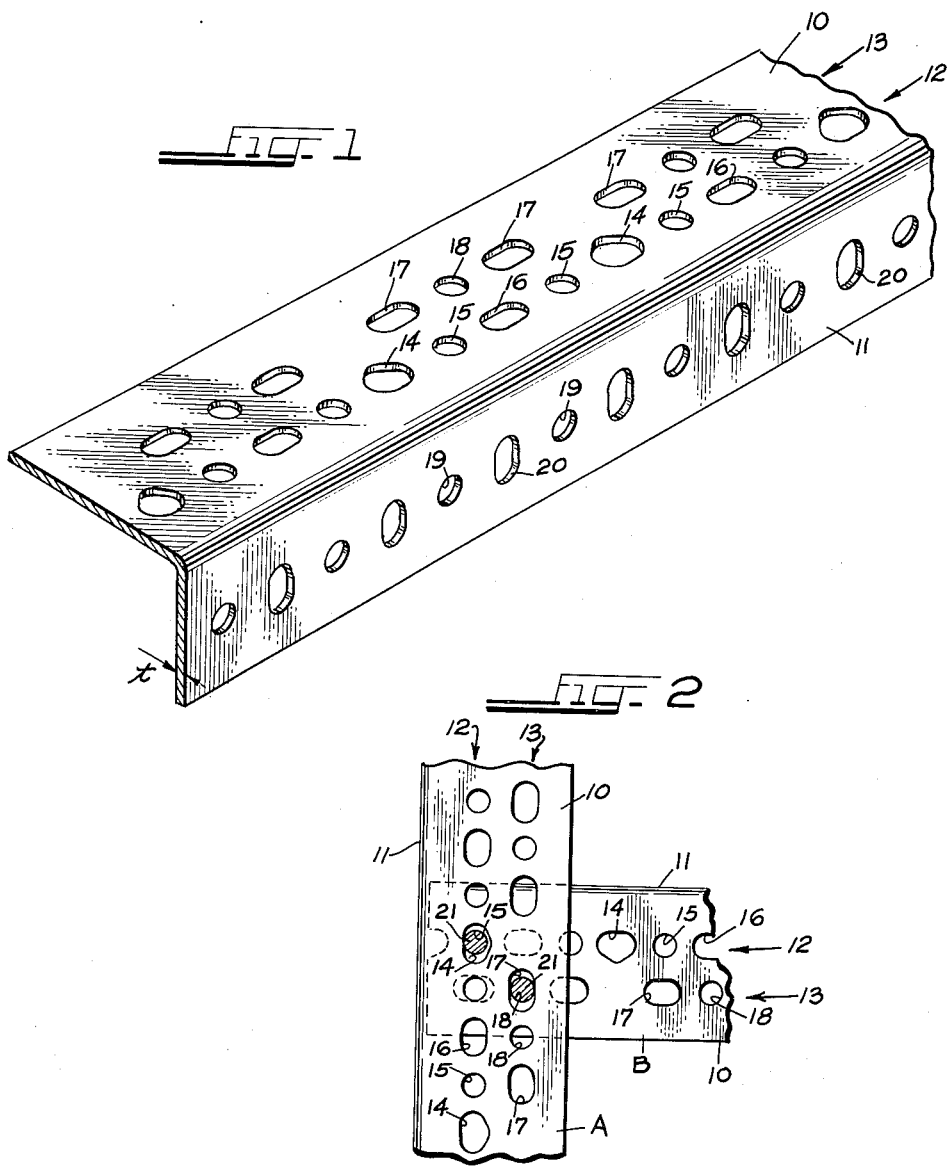
INVENTORS:
EDWARD W. GRABOWSKI
CHARLES R. JOHNSON
BY
Prangley, Baird, Clayton, Miller & Vogel
ATTYS.

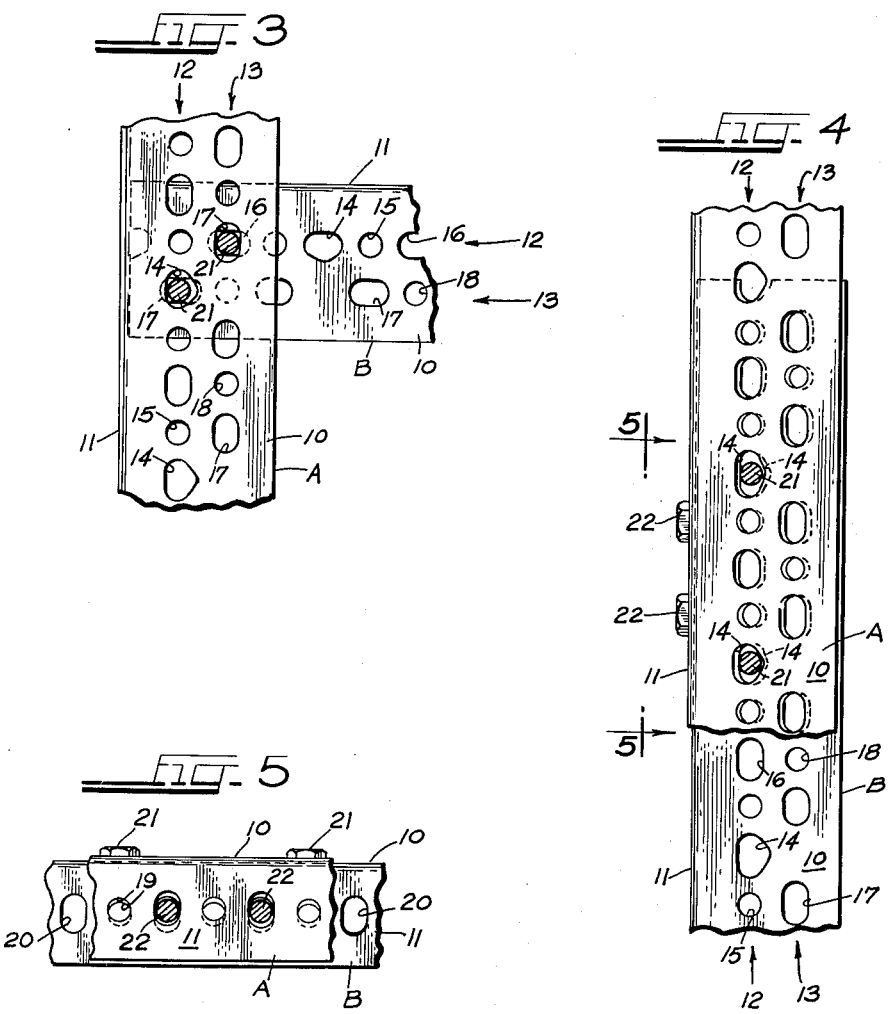

United States Patent Office 3,028,937
Patented Apr. 10, 1962

3,028,937
STRUCTURAL MEMBER
Edward W. Grabowski, Sudbury Hill, Harrow on the Hill, England, and Charles R. Johnson, Elmhurst, Ill., assignors to Acme Steel Company, Chicago, Ill., a corporation of Illinois
Filed Mar. 24, 1959, Ser. No. 801,622
6 Claims. (Cl. 189—34)

The present invention relates to construction elements, and more particularly to a highly improved longitudinally extending perforated structural member, preferably of L-shaped cross section, which may be cut to desired lengths that may be bolted together using the existing openings therein in order quickly and easily to build a great variety of structural assemblies for industrial and domestic uses.

One of the principal objects of the present invention is to provide a structural member of the kind just stated, having an improved arrangement of preformed openings therein which largely retains the rigidity and strength of the member but yet provides properly spaced and disposed existing openings permitting great versatility in the use of different lengths of the members in the formation of structures and assemblies of various kinds and shapes. Another object is to provide a structural member having the above qualities, wherein the member has an arrangement of openings permitting lengths thereof readily to be joined in adjustable right-angle joints and in splices, as well as in other kinds of connections, employing plain bolts in existing openings in the lengths, thereby avoiding the necessity for drilling holes during the erection of structures and avoiding all need for clamps and other auxiliary fastening devices. Still another object of the invention is to provide in the member oddly shaped openings of predetermined size and shape which, in combination with round and longitudinally elongated openings of predetermined related sizes and dispositions, permit the formation of such splices and joints without the use of auxiliary fastening devices other than ordinary bolts. Yet another object of the invention is to provide such a structural member wherein the openings thereof, in addition to providing the advantages just stated, also provide an easily recognizable pattern defining a basic increment of length so as to serve as a guide to show where the members may best be cut to provide lengths that may most readily be joined together in the formation of joints.

These and other objects and advantages of the present invention will be understood from the following description of a preferred embodiment thereof, taken with the accompanying drawings wherein:

FIG. 1 is a perspective view of a random length of a preformed, perforated structural member embodying the present invention;

FIG. 2 is an elevational view showing two lengths of the structural member joined together to form a right-angle joint wherein one of the members is adjustable substantially only in a lateral or transverse direction with respect to the other member, the heads of two bolts being cut away for clearness of illustration in this view;

FIG. 3 is a view similar to FIG. 2, but showing still another right-angle joint that may be formed between two lengths of the present structural member, wherein each of the members is adjustable both longitudinally and transversely with respect to the other;

FIG. 4 is an elevational view of a splice that readily may be formed between two lengths of the structural member of the present invention, the heads of two bolts being cut away for the clearness of illustration; and FIG. 5 is a fragmentary side view of the splice of FIG. 4, taken substantially along the line 5—5 of FIG. 4, again with heads of two bolts cut away for simplicity of illustration.

Referring to FIG. 1, it will be observed that the present structural member comprises a longitudinally extending angle element having a first flange 10 with a second flange 11 integrally formed along one edge thereof so as to give to the element an L-shaped cross section. In its preferred form the first flange 10 is considerably wider than the second flange 11, and the gauge of each is preferably uniformly the same throughout the length of the member. The first flange 10 is provided with two longitudinally extending rows of openings respectively designated generally by the numerals 12 and 13, the rows of openings being parallel to each other and parallel to the plane of the second flange 11. The first row of openings 12 is comprised of a plurality of equally spaced, generally equilateral triangularly shaped openings 14, on the opposite side of each of which are provided round openings 15. Between each adjacent pair of round openings 15, on the other hand, there is provided a longitudinally elongated opening 16. As will be particularly evident from FIGS. 2 and 3, the longitudinal distance between the geometric centers of the successive openings 14, 15 and 16 is uniformly the same, this distance being designated in FIG. 2 by the letter $d$.

The size of each of the round openings 15 is uniformly the same throughout the length of the row of openings 12, the opposite ends of the longitudinally elongated openings 16 being rounded and having radii substantially equal to or, if desired, slightly larger than the radius of the round openings 15 so that the transverse dimension of the elongated openings 16 is the same or slightly larger than the diameter of the round openings 15. The length of the elongated openings 16 is preferably somewhat less than twice the diameter of the round openings 15. The apices of the generally triangular openings 14 are rounded and have radii equal to the radius of the rounded ends of the longitudinally elongated openings 16, this radius, as just stated, being equal to or slightly greater than the radius of the round openings 15. The maximum longitudinal dimension of each generally triangular opening 14 is preferably equal to the longitudinal dimension of the longitudinally elongated openings 16, and the maximum transverse dimension of each generally triangular opening, on the other hand, is substantially equal to and not less than the sum of the diameter of the round openings 15 and the thickness $t$ (see FIG. 1) of the flange 11. One edge of each generally triangular opening 14, it will be observed, is in alignment with the corresponding edges of the elongated openings 16 of the row 12 and these edges, in turn, are parallel to and equally spaced from the second flange 11 of the structural member.

Transversely opposite each round opening 15 of the row 12 of openings there is provided a longitudinally elongated opening 17 in the second row of openings 13, the dimensions of these elongated openings 17 preferably being precisely the same as the dimensions of the corresponding elongated openings 16 of the first row 12 of openings. A round opening 18 is similarly provided in the second row 13 directly and transversely opposite each elongated opening 16 of the first row 12. The geometric center of each elongated opening 17 is located directly and transversely opposite the geometric center of the corresponding round opening 15 of the first row and, similarly, the geometric center of each round opening 18 of the second row is directly and transversely opposite the geometric center of the corresponding elongated opening 16 of the first row, the distance between the centers of the openings of the row 13 and the opposite openings of the row 12 being equal to the distance $d$ previously referred to. The area of the structural member opposite the generally triangular openings 14 of the first row of openings 12, it will be observed, is plain and unperforated so that the second row of openings 13 is interrupted opposite each of the generally triangular openings 14.

The second flange 11 of the structural member is provided with alternate round and elongated openings respectively designated by the numerals 19 and 20, the longitudinal spacing between the geometric centers of these latter openings being equal to the value $d$ and thus to the corresponding spacing between the openings in the first and second rows 12 and 13 in the first flange 10. Furthermore, the geometric centers of the openings 19 and 20 are preferably respectively in transverse alignment with the geometric centers of the openings 14, 15 and 16 of the row 12, as shown in FIG. 1. The dimensions of the openings 19 and 20 in the second flange 11 are identical to the corresponding round and elongated openings in the rows 12 and 13, but it will be observed that the longer axis of each of the elongated openings 20 in the second flange 11 is arranged transversely of the structural member rather than longitudinally thereof. In this respect only, the openings 20 differ from the longitudinally elongated openings 16 and 17 in the first flange 10 of the member.

It will be observed that the arrangement of the openings in the first and second flanges 10 and 11 of the present structural member is such as to minimize the amount of metal removed from any particular longitudinal segment of the member, this condition being accomplished by the fact that the longer axes of the elongated openings 20 in the second flange 11 lie transversely of that flange, while in the first flange 10 a round opening 15 or 18 is always disposed transversely opposite an elongated opening 16 or 17. Opposite each generally triangular opening 14, on the other hand, there is a substantial area of unperforated metal. This preferred arrangement of the openings gives a relatively large number of openings per unit length of the structural member, which openings may be utilized in the fabrication of joints and the like, but yet the arrangement leaves the structural member strong and rigid and suitable for relatively heavy duty use.

It will be observed that the arrangement of openings described above also gives to the present structural member a distinct, repeated configuration defining an easily recognizable pattern that designates uniform increments of length. Each basic increment of length, for example, may be considered to be the length from the geometric center of one generally triangular opening 14 to the geometric center of the next, and it has been found that the ready formation of various joints with selected lengths of the present structural member is facilitated in many cases if the structural member is sawed or cut transversely through the geometric center of a selected one of the triangularly shaped openings. If desired, therefore, the structural member may actually be embossed or stamped with an arrow or other mark opposite the geometric centers of the generally triangularly shaped openings 14 in order to serve as a cutting guide for inexperienced personnel who may use the present structural members in erecting structures of various kinds.

It will readily be understood by those skilled in the art that a great variety of structures may be easily and quickly fabricated from selected lengths of the present structural member and that a great variety of joints used in such fabrications may be quickly and easily made solely by inserting bolts through the already existing openings in the members. Three of such joints are shown in FIGS. 2 and 5 herein merely by way of example. In FIG. 2 there is shown a right-angle joint such as may be used, for example, in the construction of shelving and the like. In this arrangement one structural member A may be placed in a vertical or other position and the second structural member B may be arranged at right angles thereto with the flange 10 of each member overlapping that of the other. The particular joint shown in FIG. 2 has the advantage that it provides adjustability of the structural member B longitudinally with respect to the member A. This is accomplished by placing the flanges 10 of the two members in overlapping position wherein a round opening 15 in the first row of openings 12 of the member B is in alignment with a triangular opening 14 of the member A and a round opening 18 in the second row 13 of the member B is in alignment with an elongated opening 17 of the second row of openings 13 of the member A. With the two members in this position, bolts 21, preferably having a dimension only slightly less than the diameter of the round openings 15 and 18, are inserted through the aligned openings just described, thereby securing the two members A and B together. When the two members A and B are assembled in the manner just stated, it will be observed that the member B, when nuts (not shown) are loosened on the bolts 21, may be adjusted vertically and to some extent angularly with respect to the member A to the extent of the limits of the generally triangular opening 14 and the elongated openings 17 traversed by the bolts.

By way of further example, the members A and B may be joined together in a right-angle joint which will provide adjustability of one member both longitudinally and transversely with respect to the other. The arrangement by which this dual adjustability may be accomplished is shown in FIG. 3. As there illustrated, the flange 10 of the member B is disposed behind the flange 10 of the member A in overlapping position wherein two elongated openings 16 and 17 of the respective members are in alignment and wherein one generally triangular opening 14 of the member A is in alignment with an elongated opening 17 of the member B. Bolts 21, again having a diameter only slightly less than that of the round openings 15 and 18 may be inserted through these aligned openings, as shown in FIG. 3. When this arrangement is used in making a right-angle joint it will be appreciated that alignment of the elongated openings 16 and 17 and the alignment of one triangularly shaped opening 14 with an elongated opening 17 will permit the member B to be adjustably moved both longitudinally and transversely with respect to the member A.

It will be apparent that inasmuch as the arrangements of the openings in the present structural member are uniform throughout its length, neither the round openings 15 and 18 nor the elongated openings 16 and 17 in the flange 10 of the member can readily be utilized in the formation of an internesting splice joint, particularly when standard size bolts are to be employed having a diameter only slightly less than that of the round openings. Due to the nesting of one flange 11 inside the other, it will be understood that in making a splice one length of the structural member will necessarily be offset slightly with respect to the other when a splice is made. This offset condition is best illustrated in FIG. 4. In making such a splice, however, the generally triangularly shaped openings 14 are ideally utilized in the present invention. The two members A and B may be readily nested one within the other, as shown in FIG. 4, so that a pair of the generally triangular openings 14 of the member A are in somewhat offset alignment with a corresponding pair of the generally triangular openings 14 of the member B. Due to the particular size and shape of the generally aligned triangular openings 14 there will remain a passage therethrough through which bolts 21, again having a diameter only slightly less than the diameter of the round openings 15 and 18, may be passed for securing the flanges 10 of the two members together, the sizes and shapes of the aligned openings 14 being such that the bolts 21 provide a joinder between the flanges 10 which avoids slack or "slop." In making a splice of the kind just explained, the elongated openings 20 of the respective flanges 11 of the members A and B will be in general alignment, as shown in FIG. 5, and if desired the splice may be reinforced by inserting one or more bolts 22 through the aligned openings 20, as best illustrated in FIG. 5.

The foregoing description of one embodiment of the invention and certain representative uses thereof have been given for clearness of understanding only and no unnecessary limitations should be understood to be intended thereby, for it will be apparent to those skilled in the art that numerous variations and modifications may be made in the present invention within the spirit and scope of the appended claims.

We claim:

1. A single-piece longitudinally extending structural member having first and second flanges defining an L-shaped cross-section, said first flange having first and second longitudinally extending rows of openings therein parallel to said second flange with said first row of openings disposed between said second row of openings and said second flange, the openings of said first row including generally equi-lateral triangularly-shaped openings having rounded apices, with round openings on opposite sides of each thereof and with a longitudinally elongated opening between each pair of adjacent round openings, the geometric centers of adjacent openings in said first row being uniformly longitudinally spaced-apart a predetermined distance, the openings in said second row comprising round openings respectively disposed transversely opposite the elongated openings of said first row and longitudinally elongated openings disposed transversely opposite the round openings of said first row, the round and elongated openings of said second row being the same size as the respective round and elongated openings of said first row, the geometric centers of said round and said elongated openings in said second row being disposed said predetermined distance from the geometric centers of the transversely opposite openings of said first row, the transverse dimension of each of said elongated openings being substantially equal to the diameter of said round openings, the respective first flanges of a pair of said structural members being adapted to be overlapped at right angles in position wherein a triangular opening and an elongated opening of one of said first flanges are in respective alignment with separate ones of the round openings of the first flange of the other member to permit bolts to be inserted therethrough having diameters substantially equal to the diameter of said round openings, thereby to provide a right angle structural joint wherein one of said members may be adjustably moved substantially only longitudinally with respect to the other.

2. A single-piece longitudinally extending structural member having first and second flanges defining an L-shaped cross-section, said first flange having first and second longitudinally extending rows of openings therein parallel to said second flange with said first row of openings disposed between said second row of openings and said second flange, the openings of said first row including generally equi-lateral triangularly-shaped openings having rounded apices, with round openings on opposite sides of each thereof and with a longitudinally elongated opening between each pair of adjacent round openings, the geometric centers of adjacent openings in said first row being uniformly longitudinally spaced-apart a predetermined distance, the openings in said second row comprising round openings respectively disposed transversely opposite the elongated openings of said first row and longitudinally elongated openings disposed transversely opposite the round openings of said first row, the round and elongated openings of said second row being the same size as the respective round and elongated openings of said first row, the geometric centers of said round and said elongated openings in said second row being disposed said predetermined distance from the geometric centers of the transversely opposite openings of said first row, the transverse dimension of each of said elongated openings being substantially equal to the diameter of said round openings and the maximum longitudinal dimension of each of said generally triangular openings being substantially the same as the longitudinal dimension of said elongated openings, the respective first flanges of a pair of said structural members being adapted to be overlapped at right angles in position wherein a triangular opening and an elongated opening of one of said first flanges are in respective alignment with separate ones of the round openings of the first flange of the other member to permit bolts to be inserted therethrough having diameters substantially equal to the diameter of said round openings thereby to provide a right angle structural joint wherein one of said members may be adjustably moved substantially only longitudinally with respect to the other.

3. A single-piece longitudinally extending structural member having first and second flanges defining an L-shaped cross-section, said first flange having first and second longitudinally extending rows of openings therein parallel to said second flange with said first row of openings disposed between said second row of openings and said second flange, the openings of said first row including generally equi-lateral triangularly-shaped openings having rounded apices, with round openings on opposite sides of each thereof and with a longitudinally elongated opening between each pair of adjacent round openings, the geometric centers of adjacent openings in said first row being uniformly longitudinally spaced-apart a predetermined distance, the openings in said second row comprising round openings respectively disposed transversely opposite the elongated openings of said first row and longitudinally elongated openings disposed transversely opposite the round openings of said first row, the round and elongated openings of said second row being the same size as the respective round and elongated openings of said first row, the geometric centers of said round and said elongated openings in said second row being disposed said predetermined distance from the geometric centers of the transversely opposite openings of said first row, the transverse dimension of each of said elongated openings being substantially equal to the diameter of said round openings and the maximum longitudinal dimension of each of said generally triangular openings being substantially the same as the longitudinal dimension of said elongated openings, each of said triangular openings in said first row having one side thereof parallel to said second flange and in alignment with the corresponding sides of the elongated openings of that row, the respective first flanges of a pair of said structural members being adapted to be overlapped at right angles in position wherein a triangular opening and an elongated opening of one of said first flanges are in respective alignment with separate ones of the elongated openings of the first flange of the other member to permit bolts to be inserted therethrough, thereby to provide a right angle structural joint wherein one of said members may be adjustably moved both longitudinally and transversely with respect to the other.

4. A single-piece longitudinally extending structural member having first and second flanges defining an L-shaped cross-section, said first flange having first and second longitudinally extending rows of openings therein parallel to said second flange with said first row of openings disposed between said second row of openings and said second flange, the openings of said first row including generally equi-lateral triangularly-shaped openings having rounded apices, with round openings on opposite sides of each thereof and with a longitudinally elongated opening between each pair of adjacent round openings, the geometric centers of adjacent openings in said first row being uniformly longitudinally spaced-apart a predetermined distance, the openings in said second row comprising round openings respectively disposed transversely opposite the elongated openings of said first row and longitudinally elongated openings disposed transversely opposite the round openings of said first row, the round and elongated openings of said second row eing the same size as the respective round and elongated openings of said first row, the geometric centers of said round and said elongated openings in said second row being disposed said predetermined distance from the geometric centers of the transversely opposite openings of said first row, the transverse dimension of each of said elongated openings being substantially equal to the diameter of said round openings and the maximum longitudinal dimension of each of said generally triangular openings being substantially the same as the longitudinal dimension of said elongated openings, each of said triangular openings in said first row having one side thereof parallel to said second flange and in alignment with the corresponding sides of the elongated openings of that row, the opposite ends of each of said elongated openings being rounded, the rounded apices of said generally triangular openings and the rounded ends of said elongated openings having a radius at least as large as the radius of said round openings, the respective first flanges of a pair of said structural members being adapted to be overlapped at right angles in position wherein a triangular opening and an elongated opening of one of said first flanges are in respective alignment with separate ones of the elongated openings of the first flange of the other member to permit bolts to be inserted therethrough having a diameter substantially equal to the diameter of said round openings, thereby to provide a right angle structural joint wherein one of said members may be adjustably moved both longitudinally and transversely with respect to the other.

5. A single-piece longitudinally extending structural member having first and second flanges defining an L-shaped cross-section, said first flange having first and second longitudinally extending rows of openings therein parallel to said second flange with said first row of openings disposed between said second row of openings and said second flange, the openings of said first row including generally equi-lateral triangularly-shaped openings having rounded apices, with round openings on opposite sides of each thereof and with a longitudinally elongated opening between each pair of adjacent round openings, the geometric centers of adjacent openings in said first row being uniformly longitudinally spaced-apart a predetermined distance, the openings in said second row consisting of round openings respectively disposed transversely opposite the elongated openings of said first row and longitudinally elongated openings disposed transversely opposite the round openings of said first row, the round and elongated openings of said second row being the same size as the respective round and elongated openings of said first row, the geometric centers of said round and said elongated openings in said second row being disposed said predetermined distance from the geometric centers of the transversely opposite openings of said first row, the transverse dimension of each of said elongated openings being substantially equal to the diameter of said round openings and the maximum longitudinal dimension of each of said generally triangular openings being substantially the same as the longitudinal dimension of said elongated openings, each of said triangular openings in said first row having one side thereof parallel to said second flange and said one side being adjacent to said second flange and in alignment with the corresponding sides of the elongated openings of that row, the maximum transverse dimension of each of said triangular openings being at least the sum of the diameter of said round openings and the thickness of said second flange, a pair of said structural members being adapted to be overlapped in parallel internested position with at least one of the generally triangular openings of one of said members in substantial alignment with a corresponding triangular opening of the other to permit a bolt to be inserted therethrough having a diameter substantially equal to the diameter of said round openings, thereby to splice said members together, the respective first flanges of said pair of members, in the alternative, being adapted to be overlapped at right angles in position wherein a triangular opening and an elongated opening of one of said first flanges are in respective alignment with separate ones of the round openings of the first flange of the other member to permit bolts to be inserted therethrough having diameters substantially equal to the diameter of said round openings, thereby to provide a right angle structural joint wherein one of said members may be adjustably moved substantially only longitudinally with respect to the other.

6. The structure defined by claim 5, wherein the rounded apices of said generally triangular openings have a radius at least as large as the radius of said round openings and wherein the opposite ends of said elongated openings are rounded and have a radius substantially equal to the radius of the apices of said generally triangular openings.

References Cited in the file of this patent
FOREIGN PATENTS

| | | |
|---|---|---|
| 763,045 | Great Britain | Dec. 5, 1956 |
| 763,214 | Great Britain | Dec. 12, 1956 |
| 1,110,138 | France | Oct. 5, 1955 |